US012750285B2

(12) United States Patent
Watfa et al.

(10) Patent No.: US 12,750,285 B2
(45) Date of Patent: Sep. 29, 2026

(54) ARTIFICIAL INTELLIGENCE AND MACHINE LEARNING PARAMETER PROVISIONING

(71) Applicant: Samsung Electronics Co., Ltd., Gyeonggi-do (KR)

(72) Inventors: Mahmoud Watfa, Middlesex (GB); David Gutierrez Estevez, Middlesex (GB); Chadi Khirallah, Middlesex (GB); Jungshin Park, Gyeonggi-do (KR); Mehrdad Shariat, Middlesex (GB)

(73) Assignee: Samsung Electronics Co., Ltd (KR)

( * ) Notice: Subject to any disclaimer, the term of this patent is extended or adjusted under 35 U.S.C. 154(b) by 120 days.

(21) Appl. No.: 18/863,500

(22) PCT Filed: May 8, 2023

(86) PCT No.: PCT/KR2023/006223
§ 371 (c)(1),
(2) Date: Nov. 6, 2024

(87) PCT Pub. No.: WO2023/214863
PCT Pub. Date: Nov. 9, 2023

(65) Prior Publication Data

US 2025/0330389 A1 Oct. 23, 2025

(30) Foreign Application Priority Data

May 6, 2022 (GB) ..................................... 2206687
May 16, 2022 (GB) ..................................... 2207160
(Continued)

(51) Int. Cl.
*H04L 41/16* (2022.01)
*H04L 41/082* (2022.01)

(52) U.S. Cl.
CPC ............ *H04L 41/16* (2013.01); *H04L 41/082* (2013.01)

(58) Field of Classification Search
None
See application file for complete search history.

(56) References Cited

U.S. PATENT DOCUMENTS

2020/0145876 A1 * 5/2020 Dao .................. H04W 28/0268
2020/0228420 A1 * 7/2020 Dao ........................ H04L 43/08
(Continued)

FOREIGN PATENT DOCUMENTS

WO WO 2020/200487 10/2020
WO WO 2021/032498 2/2021

OTHER PUBLICATIONS

PCT/ISA/210 Search Report dated Aug. 17, 2023, issued on PCT/KR2023/006223, pp. 5.
(Continued)

*Primary Examiner* — Atta Khan
(74) *Attorney, Agent, or Firm* — The Farrell Law Firm, P.C.

(57) ABSTRACT

The disclosure relates to a 5G or 6G communication system for supporting a higher data transmission rate. For Artificial Intelligence/Machine Learning (AI/ML)-related external parameter provision in a mobile communication system comprising a unified data manager (UDM), a network function (NF), an AI/ML application function (AF), a network exposure function (NEF), a unified data repository (UDR), and one or more user equipment (UE), a method includes receiving, at the UDM from the NF, a subscribe request including a request for a parameter, receiving, at the UDM from the AI/ML AF via the NEF, a parameter provision request including a parameter value for the parameter and an evaluation metric associated with the parameter value, determining, by the UDM, whether to update the UDR with the
(Continued)

parameter value based on a threshold associated with the parameter and the evaluation metric, and if it is determined to update the UDR, updating, by the UDR, the UDR with the parameter value, and transmitting, by the UDM to the NF, a notification of the updated parameter value.

15 Claims, 2 Drawing Sheets

(30) Foreign Application Priority Data

| | | |
|---|---|---|
| Aug. 10, 2022 | (GB) | 2211681 |
| May 4, 2023 | (GB) | 2306578 |

(56) References Cited

U.S. PATENT DOCUMENTS

| | | | | |
|---|---|---|---|---|
| 2020/0228986 | A1* | 7/2020 | Anandan | H04W 12/08 |
| 2023/0135699 | A1* | 5/2023 | Liao | H04W 4/50 370/252 |
| 2024/0235891 | A1* | 7/2024 | Nazari | H04L 12/462 |
| 2024/0275636 | A1* | 8/2024 | Wang | H04L 12/4641 |
| 2026/0067153 | A1* | 3/2026 | Doddi | H04L 41/0627 |

OTHER PUBLICATIONS

PCT/ISA/237 Written Opinion dated Aug. 17, 2023, issued on PCT/KR2023/006223, pp. 5.

British Search Report dated Oct. 31, 2023 issued in counterpart application No. GB2306578.2, 5 pages.

3GPP TS 22.261 V18.5.0, (Dec. 2021), pp. 115.

3GPP TS 23.501 V17.3.0, (Dec. 2021), pp. 559, 3 pgs.

3GPP TS 23.502 V17.3.0, (Dec. 2021), pp. 727.

Nokia, Nokia Shanghai Bell, "NEF Discovery and Selection based on AF Address", S2-2105478, 3GPP TSG-WG SA2 Meeting #146E e-meeting, Aug. 16-27, 2021, 10 pages.

Samsung, "KI#4, New Sol: Enhancing External Parameter Provisioning", S2-2204360, 3GPP SA WG2 Meeting #151-E, May 16-20, 2022, 5 pages.

* cited by examiner

[Fig. 2]
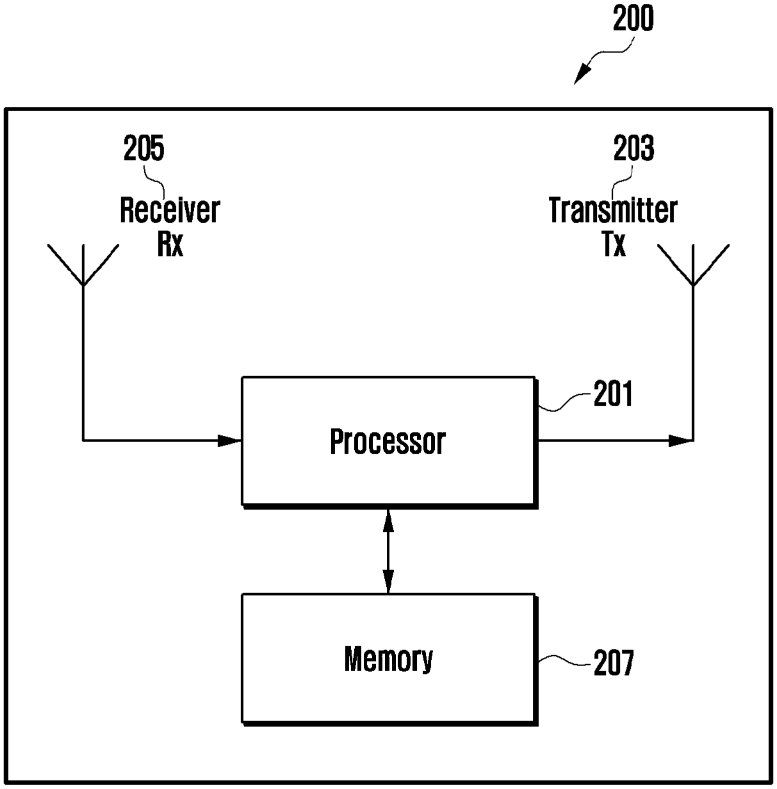

ARTIFICIAL INTELLIGENCE AND MACHINE LEARNING PARAMETER PROVISIONING

PRIORITY

This application is a National Phase Entry of PCT International Application No. PCT/KR2023/006223, which was filed on May 8, 2023, and claims priority to Great Britain Patent Application Nos. 2206687.2, 2207160.9, 2211681.8, and 2306578.2, which were filed on May 6, 2022, May 16, 2022, Aug. 10, 2022, and May 4, 2023, respectively, the entire content of each of which is incorporated herein by reference.

TECHNICAL FIELD

Certain examples of the present disclosure provide one or more techniques relating to Artificial Intelligence (AI) and/or Machine Leaning (ML) parameter (e.g. external parameter) provisioning and/or the use of such parameters. For example, certain examples of the present disclosure provide methods, apparatus and systems for AI and/or ML in a 3$^{rd}$ Generation Partnership Project (3GPP) 5$^{th}$ Generation (5G) network.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

DISCLOSURE OF INVENTION

Technical Problem

The present disclosure proposes a method and an apparatus relates to Artificial Intelligence/Machine Learning (AI/ML)-related external parameter provision in a mobile communication system.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims.

In accordance with a first aspect of the present disclosure, there is provided a method for Artificial Intelligence/Machine Learning (AI/ML)-related external parameter provision in a mobile communication system comprising a unified data manager (UDM), a network function (NF), an AI/ML application function (AF), a network exposure function (NEF), a unified data repository (UDR), and one or more user equipment (UE), the method comprising receiving, at the UDM from the NF, a subscribe request including a request for a parameter; receiving, at the UDM from the AI/ML AF via the NEF, a parameter provision request including a parameter value for the parameter and an evaluation metric associated with the parameter value; determining, by the UDM, whether to update the UDR with the parameter value based on a threshold associated with the parameter and the evaluation metric; and if it is determined to update the UDR, updating, by the UDM, the UDR with the parameter value, and transmitting, by the UDM to the NF, a notification of the updated parameter value In an example, the evaluation metric is a confidence level and/or an accuracy level associated with the parameter value.

In an example, the threshold is associated with the evaluation metric.

In an example, the method further includes: transmitting, by the UDM to the AI/ML AF via the NEF, a parameter provision response, wherein, if the UDR is not updated, the parameter provision response includes a cause value.

In an example, the cause value indicates that a confidence level associated with the parameter value is not sufficient.

In an example, the determining whether to update the UDR includes determining whether the threshold associated with the parameter is satisfied by the evaluation metric.

In an example, the threshold is satisfied if the evaluation metric is less than, less than or equal to, equal to, equal to or larger than, or larger than the threshold.

In an example, the method further includes: receiving, by the AI/ML AF from a network data analytics function (NWDAF), UE analytics; validating, by the AI/ML AF, the UE analytics and deriving the parameter value and the evaluation metric from the UE analytics; and transmitting the parameter provision request to the UDM via the NEF.

In an example, the parameter is an expected UE behaviour parameter.

In an example, the parameter is externally provisioned by the AI/ML AF.

In an example, updating the UDR includes one or more of creating, updating and deleting the parameter at the UDR.

In an example, the NF is a session management function (SMF) or an access and mobility management function (AMF).

In an example, the AI/ML AF is an AF hosting an AI/ML operation.

In an example, the notification includes the parameter value and the evaluation metric.

In an example, the mobile communication system is a 3GPP 5G mobile communication system.

In accordance with a second aspect of the present disclosure, there is provided a mobile communication system comprising a unified data manager (UDM), a network function (NF), an AI/ML application function (AF), a network exposure function (NEF), a unified data repository (UDR), and one or more user equipment (UE), wherein the mobile communication system is configured to perform any of the preceding methods.

In accordance with a third aspect of the present disclosure, there is provided a method for a unified data manager (UDM) of a mobile communication system including a core network and one or more user equipment (UE), the core network comprising a network exposure function (NEF), a network function (NF), a unified data repository (UDR), and the unified data manager (UDM), and the method comprising: receiving, at the UDM from the NF, a subscribe request including a request for a parameter; receiving, at the UDM from the AI/ML AF via the NEF, a parameter provision request including a parameter value for the parameter and an evaluation metric associated with the parameter value; determining, by the UDM, whether to update the UDR with the parameter value based on a threshold associated with the parameter and the evaluation metric; and if it is determined to update the UDR, updating, by the UDM, the UDR with the parameter value, and transmitting, by the UDM to the NF, a notification of the updated parameter value.

In an example, the evaluation metric is a confidence level and/or an accuracy level associated with the parameter value.

In accordance with a fourth aspect of the present disclosure, there is provided a network entity of a mobile communication system configured to perform the method according to the third aspect and the associated example.

In accordance with a fifth aspect of the present disclosure, there is provided a computer-readable recording medium having stored thereon computer-executable instructions which when executed by a computer cause the computer to perform any of the preceding methods.

Embodiments or examples disclosed in the description and/or figures falling outside the scope of the claims are to be understood as examples useful for understanding the present invention.

Other aspects, advantages and salient features of the invention will become apparent to those skilled in the art from the following detailed description taken in conjunction with the accompanying drawings.

Advantageous Effects of Invention

The present disclosure provides an effective and efficient method for Artificial Intelligence/Machine Learning (AI/ML)-related external parameter provision in a mobile communication system. Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 2 is a block diagram of an exemplary network entity that may be used in certain examples of the present disclosure.

MODE FOR THE INVENTION

Figure 1:
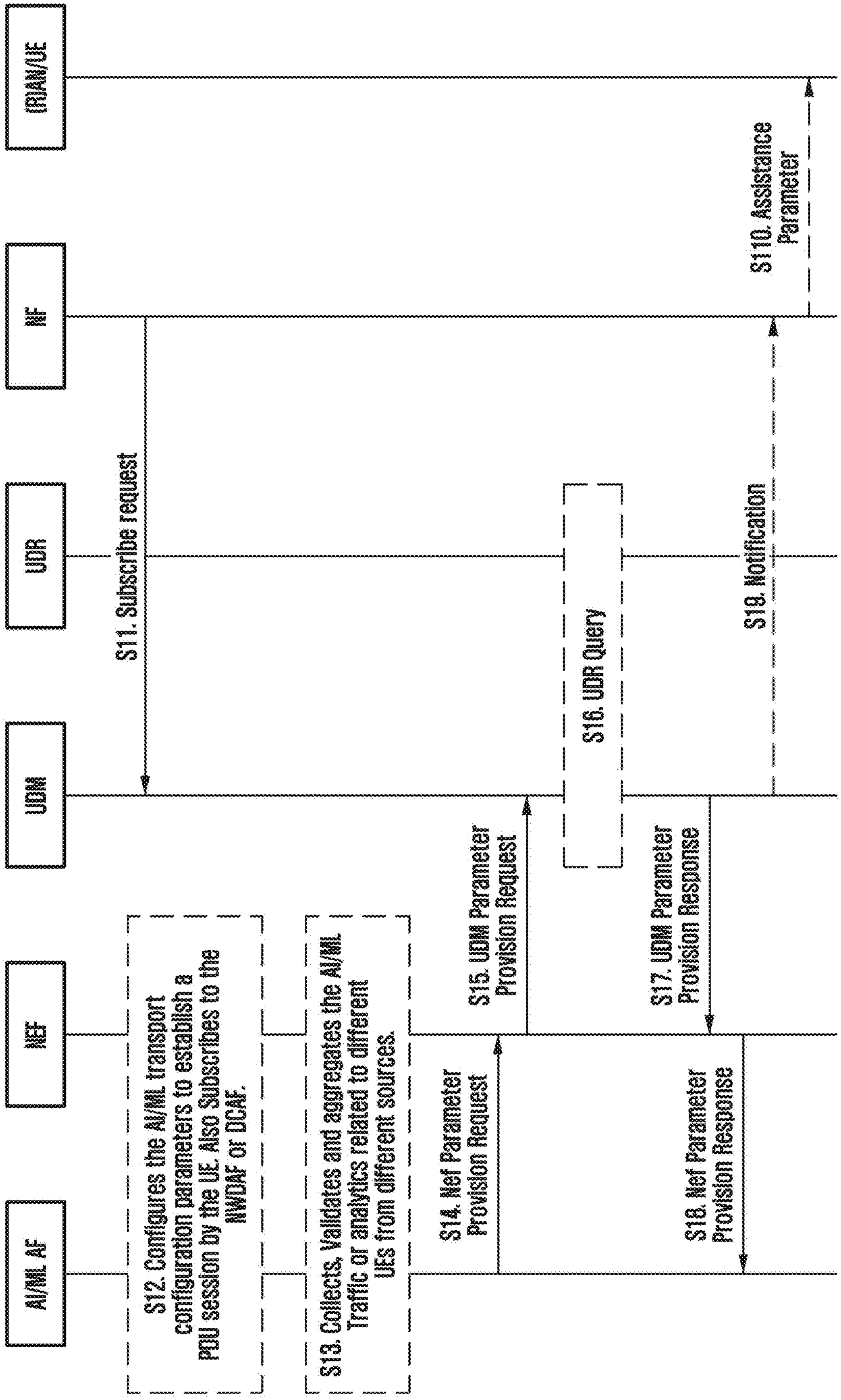
FIG. 1 is an example call flow diagram illustrating an example of external parameter provisioning via AI/ML AF.

Herein, the following documents are referenced:

[1] 3GPP TS 22.261 V18.5.0

[2] 3GPP TS 23.501 V17.3.0

[3] 3GPP TS 23.502 V17.3.0

AI/ML is being used in a range of application domains across industry sectors. In mobile communications systems, conventional algorithms (e.g. speech recognition, image recognition, video processing) in mobile devices (e.g. smartphones, automotive, robots) are being increasingly replaced with AI/ML models to enable various applications.

The 5G system can support various types of AI/ML operations, in including the following three defined in 3GPP TS 22.261 [1]:

AI/ML Operation Splitting Between AI/ML Endpoints

The AI/ML operation/model may be split into multiple parts, for example according to the current task and environment. The intention is to offload the computation-intensive, energy-intensive parts to network endpoints, and to leave the privacy-sensitive and delay-sensitive parts at the end device. The device executes the operation/model up to a specific part/layer and then sends the intermediate data to the network endpoint. The network endpoint executes the remaining parts/layers and feeds the inference results back to the device.

AI/ML Model/Data Distribution and Sharing Over 5G System

Multi-functional mobile terminals may need to switch an AI/ML model, for example in response to task and environment variations. An assumption of adaptive model selection is that the models to be selected are available for the mobile device. However, since AI/ML models are becoming increasingly diverse, and with the limited storage resource in a UE, not all candidate AI/ML models may be pre-loaded on-board. Online model distribution (i.e. new model downloading) may be needed, in which an AI/ML model can be distributed from a Network (NW) endpoint to the devices when they need it to adapt to the changed AI/ML tasks and environments. For this purpose, the model performance at the UE may need to be monitored constantly.

Distributed/Federated Learning Over 5G System

A cloud server may train a global model by aggregating local models partially-trained by each of a number of end devices e.g. UEs). Within each training iteration, a UE performs the training based on a model downloaded from the AI server using local training data. Then the UE reports the interim training results to the cloud server, for example via 5G UL channels. The server aggregates the interim training results from the UEs and updates the global model. The updated global model is then distributed back to the UEs and the UEs can perform the training for the next iteration.

Different levels of interactions are expected between UE and AF as AI/ML endpoints, for example based on [1], to exchange AI/ML models, intermediate data, local training data, inference results and/or model performance as Application AI/ML traffic.

As outlined in clause 4.15.6 of 3GPP TS 23.502 [3], provisioning capability allows an external party to provision information, such as expected UE behaviour and service specific parameters, to 5G network functions. For example, the expected UE behaviour information may comprise information (e.g. parameters) on expected UE movement and communication characteristics. Expected UE behaviour parameters may characterise the foreseen behaviour of a UE or a group of UEs. Provisioned data may be used by other NFs.

What is desired is one or more techniques for enhancing parameter (e.g. external parameter) provisioning, for example to the 5GC, for assistance to Application AI/ML operation. What is also desired is one or more techniques for use of such parameters, for example by one or more NFs.

It is also desired to set a threshold with respect to the provided parameters, where if the parameters provided by the AF (and consequently by the NEF) do not meet the threshold, then the service may not be provided. Such mechanisms are currently missing. Therefore, the current framework may accept any parameter that is provisioned by the AF whereas the 5GS may have certain thresholds that need to be met before accepting the request from the AF. Such thresholds are currently missing and it is the aim of this document to enable such thresholds and acting upon them accordingly.

The above information is presented as background information only to assist with an understanding of the present disclosure. No determination has been made, and no assertion is made, as to whether any of the above might be applicable as prior art with regard to the present invention.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim are to be understood to be applicable to any other aspect, embodiment, example or claim described herein unless in-compatible therewith.

Certain examples of the present disclosure provide one or more techniques relating to AI and/or ML parameter (e.g. external parameter) provisioning and/or the use of such parameters. For example, certain examples of the present disclosure provide methods, apparatus and systems for AI and/or ML in a 3GPP 5G network. However, the skilled person will appreciate that the present invention is not limited to these examples, and may be applied in any suitable system or standard, for example one or more existing and/or future generation wireless communication systems or standards, including any existing or future releases of the same standards specification, for example 3GPP 5G. The skilled person will also appreciate that the techniques described herein are not limited to provisioning of parameters, but may be applied to provisioning any suitable type of information.

The following examples are applicable to, and use terminology associated with, 3GPP 5G. However, as noted above the skilled person will appreciate that the techniques disclosed herein are not limited to 3GPP 5G. For example, the functionality of the various network entities and other features disclosed herein may be applied to corresponding or equivalent entities or features in other communication systems or standards. Corresponding or equivalent entities or features may be regarded as entities or features that perform the same or similar role, function or purpose within the network. For example, the functionality of the AMF, SMF, NWDAF and/or AI/ML NF in the examples below may be applied to any other suitable types of entities respectively providing an access and mobility function, a session management function, network analytics and/or an AI/ML function.

The skilled person will appreciate that the present invention is not limited to the specific examples disclosed herein. For example:

- One or more entities in the examples disclosed herein may be replaced with one or more alternative entities performing equivalent or corresponding functions, processes or operations.
- One or more of the messages in the examples disclosed herein may be replaced with one or more alternative types or forms of messages, signals or other type of information carriers that communicate equivalent or corresponding information.
- One or more further entities and/or messages may be added to the examples disclosed herein.
- One or more non-essential entities and/or messages may be omitted in certain examples.
- The functions, processes or operations of a particular entity in one example may be divided between two or more separate entities in an alternative example.
- The functions, processes or operations of two or more separate entities in one example may be performed by a single entity in an alternative example.
- Information carried by a particular message in one example may be carried by two or more separate messages in an alternative example.
- Information carried by two or more separate messages in one example may be carried by a single message in an alternative example.
- The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system (e.g. network or wireless communication system) comprising one or more such apparatuses/devices/network entities, and/or a method therefor.

A particular network entity may be implemented as a network element on a dedicated hardware, as a software instance running on a dedicated hardware, and/or as a virtualised function instantiated on an appropriate platform, e.g. on a cloud infrastructure.

In the present disclosure, a UE may refer to one or both of Mobile Termination (MT) and Terminal Equipment (TE). MT may offer common mobile network functions, for example one or more of radio transmission and handover, speech encoding and decoding, error detection and correction, signalling and access to a SIM. An IMEI code, or any other suitable type of identity, may attached to the MT. TE may offer any suitable services to the user via MT functions. However, it may not contain any network functions itself.

AI/ML Application may be part of TE using the services offered by MT in order to support AI/ML operation, whereas AI/ML Application Client may be part of MT. Alternatively, part of AI/ML Application client may be in TE and a part of AI/ML application client may be in MT.

The procedures disclosed herein may refer to various network functions/entities. Various functions and definitions of certain network functions/entities, for example those indicated below, may be known to the skilled person, and are defined, for example, in at least 3GPP 23.501 [2] and 3GPP TS 23.502 [3]:

Application Function: AF
Network Exposure Function: NEF
Unified Data Management: UDM
Unified Data Repository: UDR
Network Function: NF
Access and Mobility Function: AMF
Session Management Function: SMF
Network Data Analytics Function: NWDAF
(Radio) Access Network: (R)AN
User Equipment: UE However, as noted above, the skilled person will appreciate that the present disclosure is not limited to the definitions given in [2] and [3], and that equivalent functions/entities may be used.

As noted above, what is desired is one or more techniques for enhancing parameter (e.g. external parameter) provisioning, for example to the 5GC, for assistance to Application AI/ML operation. What is also desired is one or more techniques for use of such parameters, for example by one or more NFs.

Accordingly, certain examples of the present disclosure define (i) what parameters (or any other suitable type of information) may be provisioned, for example to 5GC, by an external party for assistance to Application AI/ML operation; (ii) how parameters may be provisioned to 5GC by an external party; and/or (iii) how provisioned parameters may be retrieved and/or maintained and/or used by 5GC NFs (e.g. UDM, AMF, SMF, NWDAF, AI/ML NF and/or FL NF). The skilled person will appreciate that the techniques relating to (i), (ii) and (iii) may be used independently or in any suitable combination.

FIG. 1 is an example call flow diagram illustrating an example of external parameter provisioning via AI/ML AF. FIG. 1 illustrates an exemplary call flow in a network comprising AI/ML AF, NEF, UDM, UDR, NF and (R)AN/UE. The skilled person will appreciate that the network may comprise one or more other entities not shown in FIG. 1.

The AI/ML AF is the network side end point for AI/ML operation that may be in charge of AI/ML operations, for example to split the model training, to distribute the model to the UE or to collect and aggregate the local models, inference feedback, etc. from multiple UEs, for example in the case of federated learning. The latter role is similar to a Data Collection Application Function (DCAF). However unlike DCAF, the processed model or data may not be only exposed to the Network Data Analytics Function (NWDAF) but also may be consumed by other 5GC NFs (e.g. via a provisioning AF in charge of provisioning external parameters and models and/or exposing corresponding events, for example defined per AI/ML operation to the 5GC NFs over service based interface) or by other consumer AFs (e.g. AF logic that may act as an external consumer of AI/ML AF models and/or AI/ML operations).

An AF (e.g. AI/ML AF, provisioning AF or consumer AF) (e.g. when in trusted domain) may register in Network Repository Function (NRF) including, for example, DNN, S-NSSAI, supported Application ID(s), supported Event ID(s) and any relevant Group ID(s). The AF can be discovered by other 5GC NFs via NRF services.

The AI/ML operation may be controlled by any suitable combination of network entities. In certain examples, AI/ML operation may be controlled (e.g. fully controlled) by a combination of AI/ML AF and AI/ML Application client on the UE. If so, 5GC NFs (e.g. AMF and/or SMF) may directly subscribe to UDM/UDR services to receive external parameters or models provisioned via AI/ML AF. Alternatively, an NWDAF containing MTLF may subscribe to UDM/UDR services to receive external parameters and/or models provisioned via AI/ML AF. 5GC NFs (e.g. AMF or SMF) may then subscribe to MTLF services to get external parameters and/or models.

In certain other examples, AI/ML operation may be controlled by a combination of AI/ML AF, AI/ML Application client on the UE and a dedicated NF within 5GC that supports services for AI/ML assistance, referred to herein as AI/ML NF. If so, AI/ML NF may subscribe to UDM/UDR services to receive external parameters and/or models provisioned via AI/ML AF. 5GC NFs (e.g. AMF or SMF) may then subscribe to AI/ML NF services to get external parameters and/or models.

In certain other examples, AI/ML operation may be controlled by a combination of AI/ML AF, AI/ML Application client on the UE and a dedicated NF within 5GC that supports AI/ML assistance services for the purpose of Federated Learning (e.g. between multiple UEs and one AI/ML AF, between a single UE and multiple AI/ML AFs or between multiple UEs and multiple AI/ML AFs), referred to herein as FL NF. If so, FL NF may subscribe to UDM/UDR services to receive external parameters and/or models provisioned via AI/ML AF. 5GC NFs (e.g. AMF or SMF) may then subscribe to FL NF services to get external parameters and/or models.

The skilled person will appreciate that the present disclosure is not limited to these examples.

FIG. 1, illustrates one example of how parameters may be provisioned to 5GC by an external party. Table 1 further below discloses various examples of what parameters may be provisioned to 5GC by an external party for assistance to Application AI/ML operation. Various examples of how provisioned parameters may be retrieved and/or maintained and/or used by 5GC NFs (e.g. AMF, SMF, NWDAF and/or AI/ML NF (and/or FL NF)) will be described further below.

Example of How Parameters may be Provisioned to 5GC by an External Party

The various call flow steps of FIG. 1 will now be described.

S11. The NF (e.g. AMF, SMF, NWDAF containing MTLF, an AIML NF or a FL NF) may subscribe to Group Subscription data, for example from UDM. The NF may request a set of one or more external provisioning parameters (or any other suitable type of information) and/or one or more ML models and/or one or more AI/ML assisted models. In certain examples, the NF may request additional information associated with each entry. For example, the NF may request an associated probability assertion (e.g. confidence) for each entry, for example depending on the AI/ML model or algorithm used to derive the parameter and/or ML model and/or AI/ML assisted model. The NF may request one or more evaluation metrics associated with the parameters and/or probability assertion, for example one or more of: the level of accuracy, precision, recall, confusion matrix (if applicable), or other ML-specific evaluation metrics that may be defined as needed.

S12. The AI/ML AF may configure AIML transport configuration information to influence traffic routing. This may be performed using any suitable technique, for example based on any suitable existing procedure, for example as defined by clause 4.3.6 of 3GPP TS 23.502 [3]. This step is performed to establish one or more User Plane PDU session(s) by UE or by group of UEs to the AI/ML AF. The PDU session may be used by AI/ML AF to collect AI/ML traffic from the UE(s). The traffic may include, for example, intermediate data, local training data, inference results and/or model performance. In certain examples, this procedure may be in addition to subscription to NWDAF for UE mobility and/or UE communication analytics for a UE or group of UEs.

In certain examples, the AI/ML AF may also subscribe to a Data Collection AF (DCAF) and/or the NWDAF containing ALF for existing collective behaviour information as part of NF load analytics (e.g. by setting an area of interest for the group of UEs as part of analytics filters).

S13. The AI/ML AF may collect AI/ML traffic and/or analytics from one or more sources, and may process the collected traffic and/or analytics using any suitable technique(s). For example, the AI/ML AF may collect AI/ML traffic and/or analytics, and validate, aggregate and/or normalise the collected AI/ML traffic and analytics related to different UEs from multiple sources (e.g. AI/ML application client on the UE, data collection and reporting client on the UE, DCAF or NWDAF containing ALF or MTLF).

In certain examples, the collected AI/ML traffic and/or analytics may be used by the AI/ML AF to derive ML models and/or AI/ML assisted models that are consumable by 5GC NFs. In certain examples, the collected AI/ML traffic and/or analytics may be used by the AI/ML AF to derive one or more other parameters, or one or more sets of parameters, that are consumable by 5GC NFs. Various examples of such parameters are defined in Table 1. The skilled person will appreciate that the present disclosure is not limited to these examples.

In certain examples, the collected AI/ML traffic and analytics can be used by the AI/ML AF to update or refine existing Expected UE behaviour parameters defined in clause 4.15.6.3 of TS 23.502 [3] for a UE or group of UEs or set of expected UE behaviour parameters where each value is associated with an entry of Expected UE behaviour parameters. In certain examples, when a set of parameters are provided, each entry may be associated with a probability assertion (e.g. confidence) and in certain examples the AI/ML parameters and/or algorithms that were used to derive each entry.

In certain examples, the network may be configured to set a threshold for each parameter that is provided by the AF, where only if the threshold is met then the request may be granted, or otherwise the request may be rejected if the parameter provided does not satisfy the threshold. Meeting the threshold condition may mean that a parameter is equal to a certain threshold, or less than a certain threshold, or greater than a certain threshold, or less than or equal to a certain threshold, or greater than or equal to a certain threshold. The network node that may be configured to operate in this manner may be a 5GC node such as the NEF, UDM, AMF, SMF, etc. It should also be noted that the threshold may be in the form of a range (e.g. minimum value to maximum value, where each may be inclusive or exclusive) and that the condition may be verifying whether a parameter value is within a range or outside a range, and acting accordingly e.g. accepting a request if a parameter value falls within a range, or rejecting a request if a parameter value falls outside of the range, etc. It may be possible that a certain combination of conditions need to be verified and for example when a certain combination of conditions is verified to be true (e.g. each parameter may be associated with a threshold and/or condition), then the request may be accepted. As another example, if a certain combination or number of conditions are not met then the request may be rejected, etc. Note that for every parameter, it may be the case that more than one (or at least one) threshold should be met and hence at least one (or more than one) condition needs to be verified. All the proposals herein with respect to verification of at least one parameter and/or at least one condition may apply to any NF such as the NEF, AMF, UDM, SMF, etc.

In certain examples, the collected AI/ML traffic and analytics can be used by the AI/ML AF to enhance Expected UE behaviour parameters defined in clause 4.15.6.3 of TS 23.502 [3] for a UE or group of UEs, e.g. including a set of parameters per information element, where each parameter is associated with a probability assertion (i.e. confidence) depending on the AI/ML model or algorithm used to derive the parameter and also other evaluation metrics such as: the level of accuracy, precision, recall, confusion matrix (if applicable), or other ML-specific evaluation metrics that may be defined as needed.

In certain examples, the collected AI/ML traffic and/or analytics may be related to a local AI/ML model from AI/ML Application client on the UE (that is not directly consumable by 5GC). In this case, the AI/ML AF may extract a set of one or more parameters and/or ML models and/or AI/ML assisted models from this that can be consumed by 5GC NFs.

In certain examples, the collected AI/ML traffic and/or analytics may be related to a local AI/ML model and/or inference results from the UE or Mobile Termination (MT) on the UE (e.g. a locally trained ML model by the UE or associated inference results that are directly consumable by 5GC). In this case, the AI/ML AF may combine and aggregate multiple local models to derive a set of one or more parameters and/or ML models and/or AI/ML assisted models that can be consumed by 5GC NFs.

S14. The AI/ML AF may provide one or more parameter(s) and/or ML model(s) and/or AI/ML assisted model(s) to be created, updated and/or deleted, for example at the UDR. This may be done using any suitable technique, for example based on existing NEF services (e.g. in the case of an untrusted AI/ML AF). In certain examples, a trusted AI/ML AF may directly interact with UDM/UDR without NEF intervention. If the request or subscription in S11 is associated with a probability assertion (e.g. confidence) or other evaluation metrics as described above, they may also be included within the UDR entries when provided.

In certain examples, when applicable, NEF may check whether the requestor is allowed to perform the requested service operation, for example by checking the requestor's identifier (e.g. The AI/ML AF Identifier). Examples of the payload of the request is disclosed in Table 1, in addition to other existing parameters, for example from clause 4.15.6.3 of 3GPP TS 23.502 [3].S15. If the AI/ML AF is authorised by the NEF to provision the parameters and/or ML models and/or AI/ML assisted models, the NEF may request to create, update, store and/or delete the provisioned parameters and/or ML models and/or AI/ML assisted models. For example, this may be performed based on existing UDM services.

If the AI/ML AF is not authorised to provision the parameters and/or ML models and/or AI/ML assisted models, then the NEF may respond in S18 to the request of S14 indicating the reason for failure in the NEF response message. In this case, steps S19 and S110 may be skipped.

In certain examples, the NEF may translate the AI/ML AF Identifier, for example to DNN and/or S-NSSAI of the AIML AF or any associated AI/ML Application Server(s) when applicable for an untrusted AF.

In one alternative, the NEF may be configured (e.g. locally configured via operation and management, or via other local policies or configuration), or may be configured by the UDM (using any existing message or service based API) to accept a parameter from the AF only if the associated probability assertion (e.g. confidence), and/or other evaluation metrics as described above, are beyond a certain value. Note that such threshold may be provided for a probability (or confidence level) or for any evaluation metric that is defined herein. As indicated, the NEF may be configured to accept the request only if a parameter (e.g. probability level, confidence level, evaluation metric, etc) provided by the AF satisfy a certain threshold, where the threshold may be e.g. that the parameter value is larger than or equal to a certain defined level. For example, the NEF may be configured to only accept or grant a request from the AF if the confidence level is at least 80%, and so on for any other evaluation metric. As such, when the NEF receives a request from the AF as described herein, the NEF may verify if there is any requirement in terms of threshold that needs to be met. If yes, the NEF may verify if the threshold condition is satisfied. The NEF may accept the request if the threshold condition is satisfied and then proceed with step S15. If the threshold is not met, then the NEF may reject the request and include cause code to describe the reason for rejection, such as but not limited to, "probability/confidence level not sufficient". It should be noted that this is just one example of a cause value that can be used and other values may be defined accordingly. As such, this example should not be considered as a limitation of the proposal but rather simply as an example. In the reject message that the NEF sends to the AF, the NEF may indicate the threshold (and/or association condition) for which a request must meet before being granted. For example, the NEF may indicate that the minimum level of confidence level should be 80%. Note that the NEF may provide such information for any list of evaluation parameters that have been proposed herein.

Note that the verification of the threshold condition may also be taken by the UDM as is described below. If this is the case, and if the NEF receives a rejection (as will be described below) indicating that a threshold condition is not met, then the NEF may in turn reject the request from the AF and optionally include similar cause value as explained above, and optionally include the threshold and/or condition that needs to be met for a request to be granted, where this information may be set to the threshold and/or condition received from the UDM. For example, if the UDM rejects a request (which was forwarded by the NEF) due to a probability level not being sufficient e.g. not being at least M %—where M is an integer, then the NEF may in turn reject the request from the AF (or send a release or cancellation request/indication to the AF) and include the requirement as received from the UDM (i.e. in this example, the requirement is that the probability should be at least M %). The proposals apply to any parameter and/or evaluation metric that has been proposed herein. Note that all the proposals herein may apply to an AMF or SMF or any other network node. As such, if the requirement is that the NEF communicates with the AMF, SMF, or any other NF regarding the proposals herein, then the behaviour proposed for the UDM would be applicable to the AMF, SMF or any other NF that takes this role. The AMF, SMF, or any other NF may also act in the same manner as described for the UDM e.g. the AMF/SMF may get a request from the NEF and verify if a certain threshold or condition is met and then accept or reject the request accordingly (in a similar manner as described for the UDM). Similarly, the NEF behaves the same in this case i.e. the NEF applies the same behaviour as that described above for the case when the AMF or SMF is the entity that verifies a certain condition or threshold and acts upon it accordingly.

S16. UDM may interact with UDR to create, update, store and/or delete the data. For example, this may be performed based on existing services (subject to authorisation). The UDM may classify the received parameters and/or ML models and/or AI/ML assisted models and then stores them under the corresponding data model within the UDR. For example, the received parameters and/or ML models and/or AI/ML assisted models may be classified into AMF associated, SMF associated, NWDAF associated, AI/ML associated and/or FL associated parameters and/or models (including validity time).

In one alternative, the UDM may be configured (e.g. locally configured via operation and management, or via other local policies or configuration), to accept a parameter from the NEF (e.g. for a particular AF or on behalf of the AF) only if the associated probability assertion (e.g. confidence), and/or other evaluation metrics as described above, are beyond a certain value. Note that such threshold may be provided for a probability (or confidence level) or for any evaluation metric that is defined herein. As indicated, the UDM may be configured to accept the request only if a parameter (e.g. probability level, confidence level, evaluation metric, etc) provided by the NEF (e.g. on behalf of the AF, or for an AF) satisfy a certain threshold, where the threshold may be e.g. that the parameter value is larger than or equal to a certain defined level. For example, the UDM may be configured to only accept or grant a request from the NEF (e.g. on behalf of the AF, or for an AF) if the confidence level is at least 80%, and so on for any other evaluation metric. As such, when the UDM receives a request from the NEF (e.g. on behalf of the AF, or for an AF) as described herein, the UDM may verify if there is any requirement in terms of threshold that needs to be met. If yes, the NEF may verify if the threshold condition is satisfied. The NEF may accept the request if the threshold condition is satisfied and then proceed with step S16 and/or S17. If the threshold is not met, then the UDM may reject the request and include cause code to describe the reason for rejection, such as but not limited to, "probability/confidence level not sufficient". It should be noted that this is just one example of a cause value that can be used and other values may be defined accordingly. As such, this example should not be considered as a limitation of the proposal but rather simply as an example. In the reject message that the UDM sends to the NEF (e.g. for an AF), the UDM may indicate the threshold (and/or association condition) for which a request must meet before being granted. For example, the UDM may indicate that the minimum level of confidence level should be 80%. Note that the UDM may provide such information for any list of evaluation parameters that have been proposed herein.

In the option where the UDM is the entity that configures the NEF to verify a condition or threshold (as described earlier above), the UDM may provide the threshold and/or condition during context setup for an AF or when a request comes from the AF e.g. in response to S15 the UDM may reject a request and indicate that acceptable threshold. However, it is also possible that the threshold at the UDM changes for a certain AF e.g. based on local policies or service level agreements. Any change in such threshold should optionally therefore lead to the UDM to send a message (or request) to the NEF where the UDM includes/indicates the new threshold and/or condition for each parameter that should be met before a request is to be granted. When the NEF receives any updated threshold value and/or condition, then the NEF applies or uses the new value and/or condition that is the most recent value which has been received from the UDM.

S17. UDM may respond in S17 to the request of S15. For example, this may be performed based on existing UDM services. If the procedure fails, a cause value may indicate the reason.

S18. NEF may respond in S18 to the request of S14. For example, this may be performed based on existing NEF services. If the procedure fails, a cause value may indicate the reason.

S19. UDM may notify the subscribed Network Function (e.g., AMF, SMF, NWDAF containing MTLF, an AI/ML NF or FL NF) of the updated UE and/or Group subscription data via a UDM Notify message.

Examples of How Provisioned Parameters may be Retrieved and/or Maintained and/or Used by 5GC NEs AMF Case S110. If the NF is AMF, the AMF may identify whether there are overlapping parameter set(s) and/or model(s) and may merge the parameter set(s) and model(s), e.g. in the Expected UE Behaviour or AI/ML assisted UE Behaviour models, if necessary. The AMF may use the received parameters and/or ML models and/or AI/ML assisted models to derive the appropriate UE configuration of the NAS parameters and to derive Core Network assisted RAN parameters.

As an example, the AMF may determine a Registration area based on parameterizing the Stationary model or Expected UE mobility model. In one alternative, if the AMF receives more than one model and/or parameter, the AMF may choose one of the received models and/or parameters based on the associated probability assertion (e.g. the model and/or parameter with the highest probability is chosen) and/or based on the evaluation metrics that are received for each model and/or parameter (e.g. level of accuracy, precision, recall, etc.). The AMF may also choose a model and/or parameter based on the algorithm used for deriving the model and/or parameter optionally in addition to the probability assertion or other metrics as stated herein. The AMF may choose a model and/or parameter based on local policies and/or subscription information. The AMF may then act as described above once a model has been selected.

In one alternative, the AMF may be configured (e.g. locally configured via operation and management, or via other local policies or configuration), or may be configured by the UDM (using any existing message or service based API) to accept a parameter from any NF (e.g. UDM, NEF, or SMF), or from the AF, only if the associated probability assertion (e.g. confidence), and/or other evaluation metrics as described above, are beyond a certain value. Note that such threshold may be provided for a probability (or confidence level) or for any evaluation metric that is defined herein. As indicated, the AMF may be configured to accept the request only if a parameter (e.g. probability level, confidence level, evaluation metric, etc) provided by the NEF (or from the UDM or from the AF or SMF) satisfy a certain threshold, where the threshold may be e.g. that the parameter value is larger than or equal to a certain defined level. For example, the AMF may be configured to only accept or grant a request from the NEF (or from the UDM or from the AF or from the SMF) if the confidence level is at least 80%, and so on for any other evaluation metric. As such, when the AMF receives a request from the NEF (or from the UDM or from the AF or from SMF) as described herein, the AMF may verify if there is any requirement in terms of threshold that needs to be met. If yes, the AMF may verify if the threshold condition is satisfied. The AMF may accept the request if the threshold condition is satisfied and then proceed with step S15. If the threshold is not met, then the AMF may reject the request and include cause code to describe the reason for rejection, such as but not limited to, "probability/confidence level not sufficient". It should be noted that this is just one example of a cause value that can be used and other values may be defined accordingly. As such, this example should not be considered as a limitation of the proposal but rather simply as an example. In the reject message that the AMF sends to the NEF (or to the UDM or to the AF or to SMF), the AMF may indicate the threshold (and/or association condition) for which a request must meet before being granted. For example, the AMF may indicate that the minimum level of confidence level should be 80%. Note that the AMF may provide such information for any list of evaluation parameters that have been proposed herein.

Note when choosing a model and optionally sending RAN assistance information to the NG-RAN, the AMF may also include/send the level of confidence and/or probability (or other evaluation metrics) to the NG-RAN.

SMF Case

If the NF is SMF, the SMF may store the received parameters and/or AI/ML assisted UE Behaviour models and associate them with a PDU Session, for example based on the DNN and S-NSSAI included in the message from UDM. The SMF may identify whether there are overlapping parameter set(s) and/or model(s), e.g. in the Expected UE behaviour or AI/ML assisted parameters, and may merge the parameter set(s) and model(s), if necessary. In certain examples, the SMF may use one or more parameters as follows:

SMF may configure the UPF accordingly. In certain examples, the SMF may use the Scheduled Communication model and/or Scheduled Communication type parameter to configure the UPF to autonomously adjust the downlink packets to buffer (e.g. across a group of UEs for FL operation) depending on the time and day of the week. In certain examples, the SMF may use the Communication model and/or Communication Duration Time or Power consumption model or Battery Indication parameter (combined with probability assertion per entry) to determine a joint and/or collective pattern of deactivating UP connection for AI/ML traffic (e.g. across a group of UEs for FL operation) to avoid or minimise any reduction in QoE or QoS per group of UEs on AI/ML Operation and to perform CN-initiated selective deactivation of UP connection of an existing PDU Session. In an alternative example, if the SMF receives more than one model and/or parameter, the SMF may choose one of the received models and/or parameters based on an associated probability assertion (e.g. the model and/or parameter with the highest probability is chosen) and/or based on the evaluation metrics that are received for each model and/or parameter (e.g. the level of accuracy, precision, recall, etc.). The SMF may also choose a model and/or parameter based on an algorithm used for deriving the model and/or parameter, which in some examples may be in addition to the probability assertion or other metrics as disclosed herein. The SMF may choose a model and/or parameter based on local policies and/or subscription information. The SMF may then act as described above once a model has been selected.

The SMF may derive SMF derived CN assisted RAN information for the PDU Session. The SMF may provide the SMF derived CN assisted RAN information to the AMF, for example as described in PDU Session establishment procedure or PDU Session modification procedure.

In one alternative, the SMF may be configured (e.g. locally configured via operation and management, or via other local policies or configuration), or may be configured by the UDM (using any existing message or service based API) to accept a parameter from any NF (e.g. UDM, NEF or from AMF), or from the AF, only if the associated probability assertion (e.g. confidence), and/or other evaluation metrics as described above, are beyond a certain value. Note that such threshold may be provided for a probability (or confidence level) or for any evaluation metric that is defined herein. As indicated, the SMF may be configured to accept the request only if a parameter (e.g. probability level, confidence level, evaluation metric, etc) provided by the NEF (or from the UDM or from the AF or from AMF) satisfy a certain threshold, where the threshold may be e.g. that the parameter value is larger than or equal to a certain defined level. For example, the SMF may be configured to only accept or grant a request from the NEF (or from the UDM or from the AF or from AMF) if the confidence level is at least 80%, and so on for any other evaluation metric. As such, when the SMF receives a request from the NEF (or from the UDM or from the AF or from the AMF) as described herein, the SMF may verify if there is any requirement in terms of threshold that needs to be met. If yes, the SMF may verify if the threshold condition is satisfied. The SMF may accept the request if the threshold condition is satisfied and then proceed with step S15. If the threshold is not met, then the SMF may reject the request and include cause code to describe the reason for rejection, such as but not limited to, "probability/confidence level not sufficient". It should be noted that this is just one example of a cause value that can be used and other values may be defined accordingly. As such, this example should not be considered as a limitation of the proposal but rather simply as an example. In the reject message that the SMF sends to the NEF (or to the UDM or to the AF or to the AMF), the SMF may indicate the threshold (and/or association condition) for which a request must meet before being granted. For example, the SMF may indicate that the minimum level of confidence level should be 80%. Note that the SMF may provide such information for any list of evaluation parameters that have been proposed herein.

Note when choosing a model and optionally sending RAN assistance information to the NG-RAN or to the AMF, the SMF may also include/send the level of confidence and/or probability (or other evaluation metrics) to the NG-RAN or to the AMF.

NWDAF Case

If the NF is NWDAF containing MTLF, the NWDAF containing MTLF may identify whether there are overlapping parameter set(s) and/or model(s) and may merge the parameter set(s) and/or model(s), e.g. in AI/ML assisted UE Behaviour models, if necessary. The NWDAF containing MTLF may share the related AI/ML assisted UE Behaviour models with AMF, SMF and/or NWDAF containing ALF, and/or any other suitable 5GC NFs. In certain examples, this may be as a response or a notification based on earlier request or subscription from the associated 5GC NFs. The AMF, SMF and/or NWDAF containing ALF may derive the associated UE Behaviour parameters, for example based on parameterising the ML models shared via NWDAF containing MTLF. They may also accordingly update UPF, other 5GC NFs or CN-assisted RAN information based on the models shared.

AI/ML NF (or FL NF) Case

If the NF is AI/ML NF (or FL NF), the AI/ML NF (or FL NF) may identify whether there are overlapping parameter set(s) and/or model(s) and may merge the parameter set(s) and model(s), e.g. in AI/ML assisted UE Behaviour or FL models, if necessary. The AIML NF or FL NF may share the related models with AMF, SMF and/or NWDAF containing ALF, and/or any other suitable 5GC NFs. In certain examples, this may be as a response or a notification based on earlier request or subscription from the associated 5GC NFs. The AMF, SMF and/or NWDAF containing ALF may derive the associated UE Behaviour parameters, for example based on parameterising the models shared via AI/ML NF (or FL NF). They may also accordingly update UPF, other 5GC NFs or CN-assisted RAN information based on the models shared.

The skilled person will appreciate that the various cases described above (AMF, SMF, NWDAF, AIML NF, FL NF) may be applied individually or in any suitable combination. The skilled person will also appreciate that other cases may be applied.

Examples of What Parameters May be Provisioned to 5GC by an External Party for Assistance to Application AI/ML Operation

TABLE 1

Description of AI/ML assisted UE Behaviour models

| AI/ML assisted models | Description |
|---|---|
| Expected UE mobility Model (or a Set of Expected UE mobility trajectory) | Identifies at least one UE expected mobility model<br>Example: Parameters characterising a random waypoint model or a reference point group model<br>Identifies at least one expected geographical movement with an associated probability assertion, and optionally this also includes the AI/ML parameters and/or algorithms that were used for each prediction. |
| Stationary model (or a set of Stationary models) | Identifies at least one model on how the UE transitions between stationary or mobile.<br>Identifies whether the UE is strictly stationary, strictly mobile, or transitions between stationary and mobile modes. For the latter, there may be at least one model for transitioning between being mobile and stationary where each may be as- |

TABLE 1-continued

Description of AI/ML assisted UE Behaviour models

| AI/ML assisted models | Description |
| --- | --- |
| | sociated with a probability assertion and other information such as, but not limited to, the time of transition, the location of transition (e.g. where the UE is expected to be mobile, or where the UE is expected to be stationary), the frequency of transition, etc. Optionally this also includes the AI/ML parameters and/or algorithms that were used for each prediction. Example: parameters of a Stochastic model. [optional] |
| Communication model (or a set of Communication models) | Indicates at least one model on how the UE transitions between CM-Connected and CM-Idle for data transmission. Optionally how much data is expected to be sent while in connected mode. Each of this may be associated with a probability assertion, and optionally the AI/ML parameters and/or algorithms that were used for each prediction. Example: parameters of a Markov model. [optional] |
| Scheduled Communication model (or a set of Scheduled Communication models) | characterises at least one model on how the UE availability for communication changes across a certain period of time e.g. a certain time duration, day of the week, etc. Each of this may be associated with a probability assertion, and optionally the AI/ML parameters and/or algorithms that were used for each prediction. [optional] |
| Power consumption model (or a set of Power consumption models) | Identifies at least one parameter/description/model on how the battery is depleted on the UE. This may also identify how the UE battery consumption is expected to vary (e.g. over time), and optionally whether the UE battery is expected to be replaced, charged, etc. Each of this may be associated with a probability assertion, and optionally the AI/ML parameters and/or algorithms that were used for each prediction. [optional] |
| Scheduled Communication model (or a set of Scheduled Communication models) | Characterises at least one model on how the Scheduled Communication Type changes between Downlink only or Uplink only or Bi-directional including Scheduled Communication Time between per mode. Each of this may be associated with a probability assertion, and optionally the AI/ML parameters and/or algorithms that were used for each prediction. [optional] |
| Presence model (or a set of Presence models) | Characterises at least one presence model across the time and day of week for the UE based on Expected UE mobility model. Each of this may be associated with a probability assertion, and optionally the AI/ML parameters and/or algorithms that were used for each prediction. [optional] |

In certain examples, when the combination of AI/ML application client on the UE, AI/ML AF and an AI/ML NF (or FL NF) are present, the AI/ML AF may also provide to the 5GC the training data and/or test data and/or inference results which was used to create or update the models and/or predictions. This may be provided via the NEF for example. The 5GC (e.g. AMF, SMF, NWDAF containing MTLF and/or any other node) may use the provided data to validate or to enhance the level of accuracy of the parameters, predictions or models at the 5GC, for example via comparison and cross-correlation with other evaluation models from other sources within 5GC. The 5GC may then choose a model/prediction based on such a comparison, for example if the 5GC results from other sources confirm the results received from the AI/ML AF. The NEF may provide this information to an AI/ML NF (or FL NF) in the C, or the AMF/SMF may request the AI/ML NF (or FL NF) to use the training/test data, which is provided also by the AMF/SMF, so that a validation of the models from the AI/ML AF can be performed. The AMF/SMF/NEF may also provide, to the AI/ML NF (or FL NF), all the information received from the AI/ML AF so that the AI/ML NF (or FL NF) can validate them as described.

FIG. 2 is a block diagram of an exemplary network entity that may be used in examples of the present disclosure, such as the techniques disclosed in relation to FIG. 1. For example, the UE, AI/ML AF, NEF, UDM, UDR, NF, (R)AN, AMF, SMF, NWDAF and/or other NFs may be provided in the form of the network entity illustrated in FIG. 2. The skilled person will appreciate that a network entity may be implemented, for example, as a network element on a dedicated hardware, as a software instance running on a dedicated hardware, and/or as a virtualised function instantiated on an appropriate platform, e.g. on a cloud infrastructure.

The entity 200 comprises a processor (or controller) 201, a transmitter 203 and a receiver 205. The receiver 205 is configured for receiving one or more messages from one or more other network entities, for example as described above. The transmitter 203 is configured for transmitting one or more messages to one or more other network entities, for example as described above. The processor 201 is configured for performing one or more operations, for example according to the operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims.

In an example in accordance with the present disclosure, a method for Artificial Intelligence/Machine Learning (AI/ML)-related external parameter provision in a mobile communication system comprising a core network and one or more user equipment (UE) is provided, the method comprising collecting, by an AI/ML application function of the mobile communication system, AI/ML-related traffic associated with the one or more UEs; deriving, by the AI/ML application function, AI/ML-related data from the AI/ML-related traffic; provisioning, by the AI/ML application function, the AI/ML-related data to a data repository (e.g. UDR) of the core network; and providing, from the data repository to another entity (e.g. NF) of the core network, the AI/ML-related data.

In an another example, the method further comprises establishing one or more Protocol Data Unit (PDU) sessions between the one or more UEs and the AI/ML application function to collect the AI/ML-related traffic.

In a another example, establishing the PDU session comprises configuring AI/ML transport configuration information.

In another example, deriving the AI/ML-related data from the AI/ML-related traffic comprises one or more of validating, aggregating, and normalising the collected AI/ML-related traffic.

In another example, the provisioning includes transmitting, to a data management function (e.g. UDM) of the core network from the AI/ML application function, a parameter provision request (e.g. Parameter Provision Request) including the AI/ML-related data; classifying and storing the AI/ML-related data in the data repository (e.g. via a UDR Query) by the data management function; and transmitting, to the AI/ML application function from the data management function, a response (e.g. Parameter Provision Response) to the parameter provision request.

In another example, the storing comprises one or more of creating, updating and deleting AI/ML-related data at the data repository.

In another example, the method further comprises receiving a subscribe request at the data management function from the another entity of the core network.

In another example, the subscribe request includes a request for subscription to one or more of an external provisioning parameter, ML models, AI/ML assisted models, and an evaluation metric associated therewith.

In another example, the method further comprises transmitting, from the data management function to the another entity of the core network, a notification (e.g. UDM Notification) indicating that AI/ML-related data has been provisioned.

In another example, the method further comprises deriving one or more network configuration or core network assisted parameters at the another network entity based on the AI/ML-related data.

In another example, the another network entity is one of an Access and Mobility Function, a Session Management Function, Network Data Analytics Function, an AI/ML network function, a federated learning network function, and the UE.

In another example, the AI/ML application function communicates with the data management function via a Network Exposure Function (NEF).

In another example, the AI/ML-related traffic includes one or more of ML models, AI/ML assisted models, intermediate data, local training data, inference results or model performance information.

In another example, the AI/ML-related traffic is collected from one or more of an AI/ML application client on a UE, a data collection and reporting client on a UE, a Network Data Analytics Function (NWDAF), and Data Collection Application Function (DCAF).

In another example, the AI/ML-related data comprises or more ML models, AI/ML assisted models, updated existing models, updated expected UE behaviour parameters (and/or set of expected UE behaviour parameters), other parameters consumable by Network Functions (NF) of the core network, training data, test data, and inference results.

In another example, the AI/ML-related data includes one or more of network parameters, an expected UE mobility model, a stationary model, a communication model, a scheduled communication model, a power consumption model, a scheduled communication type model, a presence model, and an evaluation metric associated therewith.

In another example, the AI/ML-related traffic includes traffic and inference results related to a model local to a UE.

In another example, the deriving the AI/ML-related data comprises combining AI/ML-related traffic associated with a plurality of AI/ML models.

In another example, the evaluation metric includes a probability assertion or confidence.

In another example, the mobile communication system is a 3GPP 5G mobile communication system.

In an example in accordance with the present disclosure, a mobile communication system comprising a core network including a data repository and another entity, an AI/ML application function, and one or more user equipment (UE) is provided, wherein the AI/ML application function is configured to collect AI/ML-related traffic associated with the one or more UEs, derive AI/ML-related data from the AI/ML-related traffic; and provision the AI/ML-related data to the data repository; and wherein the data repository is configured to provide at least some of the AI/ML-related data to the another network entity.

In an example in accordance with the present disclosure, a method for an AI/ML application function of a mobile communication system including a core network is provided, the method comprising collecting AI/ML-related traffic associated with one or more UEs; deriving AI/ML-related data from the AI/ML-related traffic; and provisioning the AI/ML-related data to a data repository of the core network.

In an example in accordance with the present disclosure, a network entity of a mobile communication system configured to perform the method of the preceding example is provided.

| Acronyms and Definitions |
|---|
| 3GPP 3rd Generation Partnership Project |
| 5G 5th Generation |
| 5GC 5G Core |
| AF Application Function |
| AI Artificial Intelligence |
| AIML Artificial Intelligence and Machine Learning |
| ALF/AnLF Analytics Logical Function |
| AMF Access and Mobility management Function |
| AS Application Server |
| CM Connection Management |
| CN Core Network |
| DCAF Data Collection Application Function |
| DNN Data Network Name |

-continued

| Acronyms and Definitions |
|---|
| FL Federated Learning |
| ID Identity/Identifier |
| IMEI International Mobile Equipment Identities |
| ML Machine Learning |
| MT Mobile Termination |
| MTLF Model Training Logical Function |
| NAS Non-Access Stratum |
| NEF Network Exposure Function |
| NF Network Function |
| NRF Network Repository Function |
| NW Network |
| NWDAF Network Data Analytics Function |
| PDU Protocol Data Unit |
| (R)AN (Radio) Access Network |
| SIM Subscriber Identity Module |
| SMF Session Management Function |
| S-NSSAI Single Network Slice Selection Assistance Information |
| TE Terminal Equipment |
| TS Technical Specification |
| UDM Unified Data Manager |
| UDR Unified Data Repository |
| UE User Equipment |
| UL Uplink |
| UP User Plane |
| UPF User Plane Function |

The invention claimed is:

1. A method performed by a unified data manager (UDM) in a communication system, the method comprising:
- receiving, from a network function (NF), a subscribe request including a request for a parameter;
- receiving, from an artificial intelligence/machine learning (AI/ML) application function (AF), via a network exposure function (NEF), a parameter provision request including a parameter value for the parameter and an evaluation metric associated with the parameter value;
- determining whether to update a unified data repository (UDR) with the parameter value based on a threshold associated with the parameter and the evaluation metric;
- in case that it is determined to update the UDR, updating the UDR with the parameter value; and
- transmitting, to the NF, a notification of the updated parameter value.

2. The method of claim 1, wherein the evaluation metric includes at least one of a confidence level or an accuracy level associated with the parameter value, and
- wherein the threshold is associated with the evaluation metric.

3. The method of claim 1, further comprising transmitting, to the AI/ML AF, via the NEF, a parameter provision response,
- wherein, in case that the UDR is not updated, the parameter provision response includes a cause value, and
- wherein the cause value indicates that a confidence level associated with the parameter value is not sufficient.

4. The method of claim 1, wherein determining whether to update the UDR comprises determining whether the threshold associated with the parameter is satisfied by the evaluation metric, and
- wherein the threshold is satisfied if the evaluation metric is less than, less than or equal to, equal to, greater than or equal to, or greater than the threshold.

5. The method of claim 1, wherein the parameter includes an expected user equipment (UE) behavior parameter, and wherein the parameter is externally provisioned by the AI/ML AF.

6. The method of claim 1, wherein updating the UDR comprises one or more of creating, updating, or deleting the parameter at the UDR, and wherein the notification includes the parameter value and the evaluation metric.

7. The method of claim 1, wherein the NF includes a session management function (SMF) or an access and mobility management function (AMF), and wherein the AI/ML AF hosts an AI/ML operation.

8. A unified data manager (UDM) in a communication system, the UDM comprising:

a transceiver; and at least one processor coupled with the transceiver and configured to:

receive, from a network function (NF), a subscribe request including a request for a parameter, receive, from an artificial intelligence/machine learning (AI/ML) application function (AF), via a network exposure function (NEF), a parameter provision request including a parameter value for the parameter and an evaluation metric associated with the parameter value, determine whether to update a unified data repository (UDR) with the parameter value based on a threshold associated with the parameter and the evaluation metric, in case that it is determined to update the UDR, update the UDR with the parameter value, and transmit, to the NF, a notification of the updated parameter value.

9. The UDM of claim 8, wherein the evaluation metric includes at least one of a confidence level or an accuracy level associated with the parameter value, and wherein the threshold is associated with the evaluation metric.

10. The UDM of claim 8, wherein the at least one processor is further configured to transmit, to the AI/ML AF, via the NEF, a parameter provision response, wherein, in case that the UDR is not updated, the parameter provision response includes a cause value, and wherein the cause value indicates that a confidence level associated with the parameter value is not sufficient.

11. The UDM of claim 8, wherein the at least one processor is further configured to determine whether to update the UDR by determining whether the threshold associated with the parameter is satisfied by the evaluation metric, and wherein the threshold is satisfied if the evaluation metric is less than, less than or equal to, equal to, greater than or equal to, or greater than the threshold.

12. The UDM of claim 8, wherein the parameter includes an expected user equipment (UE) behavior parameter.

13. The UDM of claim 8, wherein the parameter is externally provisioned by the AI/ML AF.

14. The UDM of claim 8, wherein the at least one processor is further configured to update the UDR by performing one or more of creating, updating, or deleting the parameter at the UDR, and wherein the notification includes the parameter value and the evaluation metric.

15. The UDM of claim 8, wherein the NF includes a session management function (SMF) or an access and mobility management function (AMF), and wherein the AI/ML AF hosts an AI/ML operation.

* * * * *